Patented Mar. 3, 1953

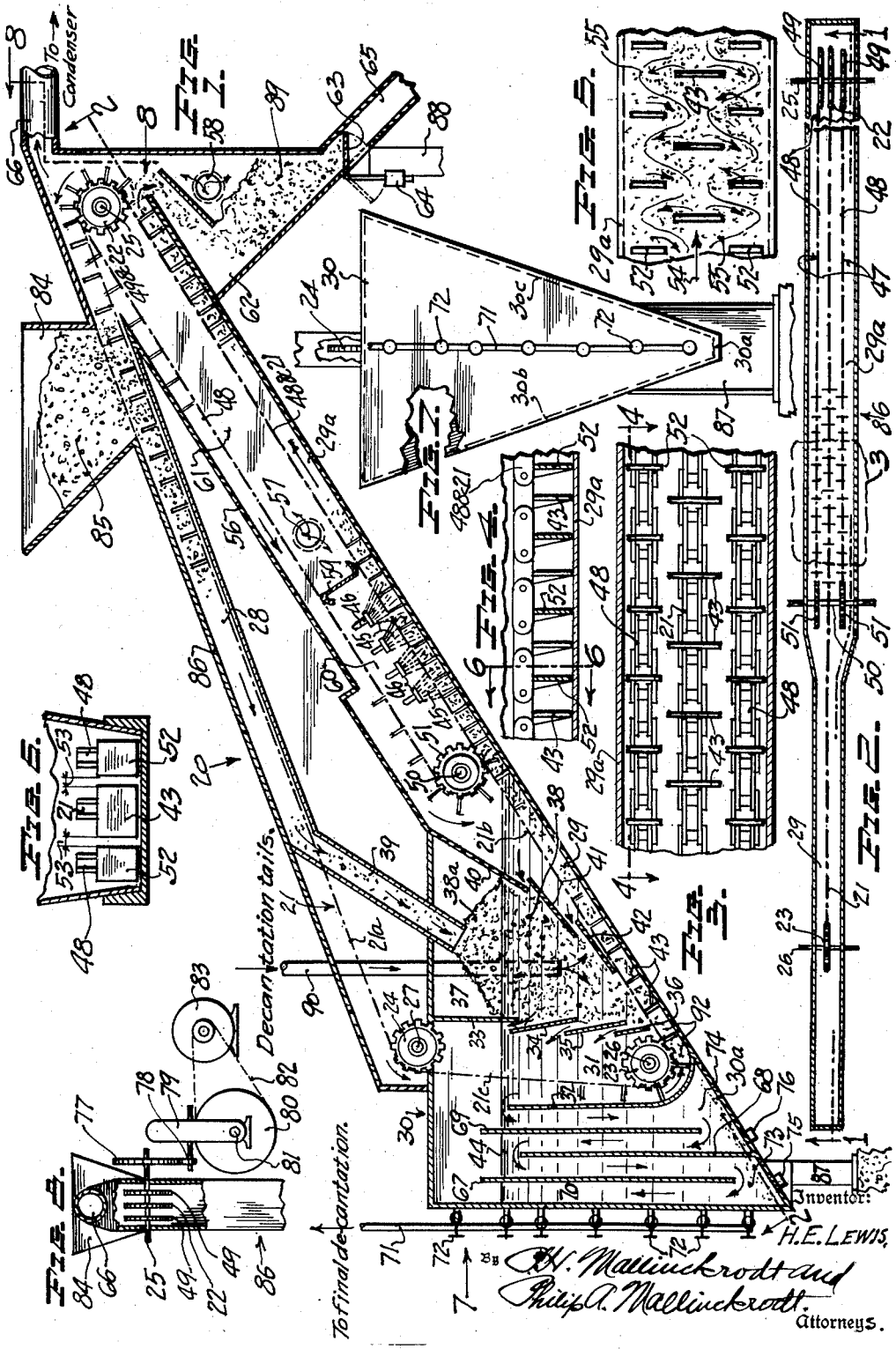

2,630,377

UNITED STATES PATENT OFFICE 2,630,377

CONTINUOUS LEACHING APPARATUS

Henry E. Lewis, Murray, Utah, assignor of seventy per cent to Susan Lewis Rasmussen, twenty per cent to Emille G. Jensen, and ten per cent to Philip H. Mallinckrodt and Philip A. Mallinckrodt, all of Salt Lake City, Utah Application August 29, 1947, Serial No. 771,214

7 Claims. (Cl. 23—270)

This invention relates to a process and apparatus for abstracting solubles from solids, of which the principal object is to provide a substantially continuous dissolving procedure whereby products of relatively high degrees of purity are automatically abstracted from a solid in a single pass through a solvent.

More specific important objects include:

Flexibility of procedure tailored to the demands of numerous different materials;

Especial adaptation to the abstraction of substances of high viscosity from solids with which such substances are naturally associated, an example being the fossilized resins that occur in certain kinds of coal;

Reduction of costs, including initial plant expense as well as maintenance and operative expenses.

Other objects will become obvious as the following description proceeds.

According to the invention, the raw material containing the desired product or products is crushed or ground to a suitable discrete size and conveyed in a continuous and substantially uniform manner into and through a body or bath of solvent. The speed of travel of the material is determined by the relative characteristics of the raw material and the solvent. A feature of the invention is that any insoluble residue plus a varying amount of partially dissolved soluble content that adheres thereto is lifted out of the bath and as it emerges therefrom, is conveyed upwardly through a conduit having an upward inclination corresponding to the requirement that is determined by the characteristics of a given residue and its adhering accompaniment. In proximity to the point of emergence, the ascending mass is subjected to a spreading and interspersing action which places the mass in a favorable condition to be sprayed with a certain quantity of the solvent that afterwards flows back into the bath and serves the make-up solvent requirement to keep the solvent content of the bath from undue depletion. After being thusly sprayed, the residual mass continues its ascent through the inclined conduit, and presently encounters a current of heated air that volatilizes substantially any adhering solvent the same being exhausted through a ventilating system that carries it to a suitable point for condensation and re-use. Meanwhile, the residual mass is dried by the same current of air, the finally dried residue being disposed of as desired, usually in the form of a by-product.

A noticeable feature is the mechanism for causing the aforementioned spreading of the ascending mass. This mechanism comprises a conveyor system that includes a centrally disposed, bladed conveyor, which is operatively flanked by two suitably bladed conveyors, the blades of the latter being in staggered registry with the blades of the central conveyor. The operative aggregate result of the staggered bladed arrangement is that the ascending material is continually sifted through the spaces between the respective blades, much after the manner of a person sifting sand through the fingers of both hands.

In connection with the invention it has been discovered that in order to secure optimum continuous performance, the timing of the various operations is vital. That is to say, for any certain raw material, a given quantity thereof will require a certain quantity of solvent to bring it into a solution of the desired density or viscosity. This means that the inclination of the aforementioned ascending conduit, as well as the relative locations of the cooperating elements, be carefully predetermined in accordance with any given solids and solvents that are to be processed.

In the accompanying drawing, which is largely schematic or diagrammatic in form and which illustrates one embodiment of an apparatus for practicing the process, Fig. 1 represents a vertical longitudinal section taken on the line 1—1 in Fig. 2;

Fig. 2, an inclined plan largely in section taken on the line 2—2 in Fig. 1;

Fig. 3, an enlargement of substantially the portion enclosed by the broken line 3 in Fig. 2;

Fig. 4, a fragmentary vertical section taken along the line 4—4 in Fig. 3;

Fig. 5, a fragmentary bottom plan, corresponding to Fig. 3, the supposition being that the bottom of the conduit is transparent so the movements of the traveling contents can be observed;

Fig. 6, a fragmentary cross-section taken on the line 6—6 in Fig. 4;

Fig. 7, an end elevation viewed as indicated by the arrow 7 in Fig. 1, parts in the background being largely omitted; and Fig. 8, a fragmentary opposite end elevation partially in vertical section taken on the line 8—8 in Fig. 1.

Since the invention has a typical application in the extraction or abstraction of fossilized natural resins from certain coals, the adaptation for this purpose will hereinafter be quite fully described.

It is desirable that the natural characteristics of the various resins be retained without alteration. This means that the colors of the resins may be white, light yellow, light orange, deep red orange, light brown, dark brown and so on, depending on the sources from which the various resins are derived. The recovery of the variously colored resins is accomplished through the use of different solvents or a combination of such solvents, as well as through properly predetermining the time periods during which the different resins remain in contact with the respective solvents.

A plant to accomplish the desired results is arranged with the proper equipment and facilities to conduct the raw material through the various process phases and subject it during its travel to the required physical and chemical conditions. The raw material, in this case coal, containing the desired resins, after being received from the mine is dried and sized in any usual or well known manner before it is delivered into the receiving bins of the plant.

It is desirable to prevent the segregation of particles of different sizes in order that the finer particles will not be allowed to accumulate in one place and thereby retard the proper penetration of the solution when the material is passed into the solvent. This promotes rapidity of extraction of the solubles.

It is the property of the solvents used in the process to act energetically and quickly in dissolving the resins, for which reason it is important to limit the time of exposure of the raw material to the solvents, since the chemical activity of the latter is such that, after acting upon the resins, chemical action would be continued upon other ingredients of the coal, thereby contaminating the desired solution. Consequently it becomes important to so arrange the apparatus that coal containing a particular resin should remain in a particular solvent only as long as is necessary to abstract the resins.

Referring to the drawing, the numeral 20, Fig. 1, indicates in general a typical mechanical plant for accomplishing the purposes of the process. The plant comprises an endless conveyor 21 that is disposed in a substantially vertical plane in the form of a polygon, which in this instance is preferably of a triangular configuration, as illustrated. The conveyor in this instance consists of an endless sprocket chain having the upper run 21a, the lower run 21b and the intermediate run 21c, these runs forming substantially the sides of the triangle. The sprocket chain is provided with suitable pickup elements or flights that will presently be described more in detail, these being welded or otherwise attached to certain links of the sprocket chain.

The chain travels operatively around idler sprocket wheels 22, 23 and 24, which are disposed in proximity to respective vertices of the triangular configuration. Each of the sprocket wheels is rotatively mounted in any well known manner, for example, keyed on the respective shafts 25, 26 and 27 that run in suitable journal bearings, as is common practice. The shaft 25 in this instance is the head or drive, and 26 the tail shaft. The upper run 21a travels in a trough 28, and the lower run, in a trough 29, the latter at a certain point widening out into a continuing trough portion 29a, see Fig. 2.

At 30 is a container for solvent, the bottom 30a of the container being preferably in alignment with the bottom of trough 29. The container 30 preferably has a hopper-like configuration such as is indicated in Fig. 7, the side-walls 30b and 30c converging from the top towards the bottom 30a. The sprocket wheel 26 is disposed in a compartment 31 that is at least partially defined within the container 30 by means of a wall 32 on one side and a series of overlapping plates 33 to 36 on the other side. The plates are preferably inclined and directed away from the compartment 31 and are spaced apart from one another at the overlapping portions so as to form passages for solvent between respective pairs of the plates.

At 37 is a compartment into which raw material 38 is discharged from a spout 39 that is connected to the conveyor trough 28. The compartment 37 is at least partially enclosed by the plates 33 to 36 on one side and by inclined plates 40, 41 and 42 on the other side. The latter plates are arranged in overlapping, spaced relation one to another similarly to plates 33 to 36. The respective spaces between plates 40 to 42 afford passages for solvent as indicated by the arrows. The overlapping arrangement of the plates 33 to 36 and 40 to 42 causes material 38 to descend through compartment 37 in a cascading manner whereby segregation of the finer particles thereof is largely prevented. The lower plates 36 and 42 of the two groups are spaced apart from each other so as to form an aperture through which material 38 gradually passes down into trough 29, where it is picked up by the lower run 21b of the endless conveyor and dragged upwardly along the trough 29 and then along its widened portion 29a. The dragging of the material is facilitated by the aforementioned flights, these being for example in the form of depending blades 43, suitably spaced apart from one another throughout the entire length of the endless conveyor chain 21. The head sprocket 22 is driven in the proper direction to cause the upward travel of the lower run 21b.

Supposing that the solvent in the container 30 has the average level 44, the conveyor blades 43 in their upward travel will emerge from the solvent bath at that level, dragging partially processed material from the bottom of the mass 38, this material having a tendency to pack rather closely between the blades. As the packed material ascends from the bottom of the mass 38 to a point where the conveyor chain emerges from the solvent, it is partially loosened due to the dissolving action of the solvent. However, somewhat beyond the point of emergence it becomes desirable to disperse the material in the more ample trough portion 29a and afterwards to continue the dispersing action so as to expose as far as possible all the individual particles of the ascending mass to a washing action, caused by a plurality of solvent sprays 45 that are discharged from suitable nozzles 46 and thoroughly drench the ascending dispersed material.

The dispersing and interspersing effects that exercise a certain sifting action upon the material in the trough portion 29a, is largely brought about by a separate endless conveyor unit 47. This unit comprises two sprocket chains 48 that flank the main conveyor chain 21 on either side. These auxiliary sprocket chains 48 have the same pitch as the main sprocket chain 21 and are actuated by the head sprocket drive wheels 49 that are rigidly mounted on the head shaft 25. At 50 is a tail shaft on which are mounted tail sprocket wheels 51 to accommodate the chains 48, it being understood that there is no sprocket wheel on this shaft for the main chain 21. Obviously, the dispersing conveyor unit sprocket chains run at exactly the same speed as the main conveyor chain 21. However, when the flights or blades of the two are considered, there is a slight difference in that the blades 43 of the central conveyor chain 21 are preferably somewhat greater in width than are the blades 52 of the auxiliary chains. Moreover, the blades 52 are staggered in their relation to the blades 43, although the pitch is the same in all the chains, as is clearly shown in Figs. 3 and 5. The blades 43 and 52 have a certain space 53 between the edge portions thereof for the purpose of facilitating the aforementioned sifting action. The relative arrangements of the blades 43 and 52 as shown in Fig. 5, when running in the direction of the arrow 54, exert the desired dispersing and interspersing action.

The desired action is brought about by the fact that as the blades travel in unison, the material amongst the blades flows off, for example, from the center blades 43 directly into the path of the next following pair of flanking blades 52, but in another instant that material is caused to flow off the two neck-to-neck traveling blades 52 back into the path of other, and oncoming, blades 43. The ultimate result is a substantially sinuous travel along, for example, wavy paths 55, during which occurs a thorough exposure of the continuously traveling, dispersed material particles, first to the spraying action of the make-up fluid and afterwards to currents of heated air that flow into the conveyor housing 56 from a suitable source (not shown), through inlet pipes 57 and 58, in order to thoroughly dry the passing material. At 59 is a baffle that separates the spraying chamber 60 from the drying chamber 61.

After leaving the drying chamber 61, the dried material is discharged into a bin 62 where it piles up against a counterweighted gate 63, the counterweight being located at 64. As the material accumulates, it exerts a pressure on gate 63 and at intervals allows a portion thereof to flow down through the spout 65 for final disposal.

Since the solvents used are highly volatile, it becomes an imperative requirement that the entire plant 20 be housed substantially in an airtight manner so that the vapors from the solvents can be exhausted from the housing and be condensed for re-use. In the present instance the pipe 66 leads to a condensing unit (not shown) that is remote from the plant 20.

The desired product of the plant is a resin-charged solvent forming a solution that is passed back and forth between the baffle walls 67, 68 and 69, Fig. 1, the solution being finally drawn off from the space 70 through a pipe 71. The latter is provided with valves 72 located at different heights. The purpose of the baffle walls is to cause as much as possible of any sediment that may be carried along by the solution to be deposited at the bottom of baffle compartments, such as those at 73 and 74, thereby causing largely a clarification of the solution that is finally drawn off through pipe 71. As sediment accumulates in the compartments 73 and 74 it can be drawn off through removable plugs 75 and 76.

The entire conveyor system, consisting of the main conveyor 21 and the auxiliary conveyors 48, may be driven by any suitable motive mechanism. In this instance the head shaft 25 carries a gear 77 meshing with a pinion 78 mounted on the worm wheel shaft of a speed reducer 79, the latter having, for example, a V-grooved wheel 80 on the worm shaft 81 thereof. A V-belt drive 82 extends from the wheel 80 to any source of motive power, such as an electric motor 83. Take-up mechanism (not shown) of any usual kind may be provided for the conveyor chains.

The prepared discrete solids from which the soluble content is to be abstracted or extracted are deposited in a hopper bin 84 that feeds the discrete material 85 directly into the upper conveyor run 21a, which in turn delivers the material into the spout 39 in a regulated, predetermined manner. Thereafter the material from the spout 39 flows continuously through the plant in the manner hereinbefore fully described.

It is to be noticed that the blades 43 as they travel through the trough 28, extend upwardly from the conveyor chain, but later depend from the conveyor chain when entering the trough 29, and continue in this fashion throughout the widened trough 29a. In the former case the traveling material rests largely on the conveyor chain while in the latter, it is dragged along below the chain.

The housing 86 of the plant as herein outlined is suitably supported in any desired manner, for example on the lower column 87 and the upper column 88.

For convenience, plant housing is illustrated without showing any particular means of access to the interior thereof, but it is self evident that openings (not shown) with substantially airtight covers or doors must be provided at strategic points. Ordinarily, seals against communication with the atmosphere are provided by the discrete material in receiving bin 84 and by the accumulated by-product 89 in the bin 62. The portion 38a of discrete material above the level 44 of the solvent in compartment 37 forms a seal against the escape of vapors.

A prime consideration of the process of the invention is that the rate of travel of the conveyors, the rate of solvency of the chemicals and the lengths of the various treatment travel courses shall be so coordinated that the optimum results are attained. For example, according to actual practice, certain chemicals will dissolve practically all the solubles in a certain coal in twenty minutes, which means that the conveyor 21 is so speeded that any coal particle must pass through the body of solvent 90 in twenty minutes. In the present showing the rate of travel of the conveyors may be taken as being one foot per minute.

In conjunction with the extraction plant herein disclosed, it is desirable to provide a decantation plant (not shown) since for commercial purposes it is necessary to further clarify the solution that is discharged through the pipe 71. However, such a decanting plant is not a part of the present invention, although a pipe 91 is shown through which the rejected material from such a plant may drain into the body 38 of incoming material.

The sprocket chains 21 and 48 in Figs. 1 and 2 are for convenience represented by dot-and-dash lines indicating the pitch lines thereof. In Figs. 4 and 5 an actual construction of a chain is shown.

The space 92 which is in communication with the lower portion of compartment 37 is constantly and automatically cleared of fragmentary portions from the body of material 38 by means of lower conveyor run 21b.

In the process of abstracting the soluble product from insoluble material, the careful endeavor is, not to employ heat above the natural temperature under which the original product, in this instance resin, was created. Thus the resins are released in the natural state and retain the original characteristics. The objective sought is to give buyers and users the product in the natural state so the characteristics can be changed as best suits a particular use. The solvent is only a carrier or vehicle qualifying as an instrument of service.

Make-up solvent coming through nozzles 46 from a suitable source of supply (not shown) is sprayed under suitable pressure and counterflows upcoming material. The counterflowing substances in due time pass through the decantation portions of container 30, as defined by walls 67 to 69.

The retarded action imposed on the material in its upward travel, illustrated in Fig. 5, keeps the material in treating chambers 60 and 61 several times as long as would the regular travel of the conveyor.

Summarizing the manner of obtaining the desired retarded motion, it may be stated that the discrete material is supplied to the processing surface, consisting in this instance of the inner surface of trough portion 29a, so that the material encounters the conveyor blades 43 and 52, the latter constituting a staggered gang of finger-means that advances continuously along and in close proximity to the processing surface.

During the advancing travel of the finger means, the staggered disposition thereof becomes eminently effective to push or sweep the discrete material particles back and forth transversely across the line of continuous advance. This induces discrete particles to travel in the desired sinuous paths.

The back and forth sidewise movement of the particles frequently imposes a slight backward motion component upon some of the particles, but the net motion effect is always continuous raking in the direction of advance.

The present application for patent is a continuation-in-part of an earlier one filed May 11, 1943, Serial No. 486,606, now abandoned.

While a specific embodiment of the invention is herein shown and described, the scope of the invention is limited only by the terms of the following claims.

Having fully described the invention, what is claimed is:

1. Apparatus for extracting soluble constituents from solid materials, comprising a container for a liquid which is a solvent for the soluble constituent to be extracted from a solid material, said container being of narrow trough formation having an upwardly sloping bottom which continues uninterruptedly through an upwardly sloping extension of said trough formation beyond said container, said extension of the trough formation being significantly wider than said container; a scraper conveyor operatively disposed with respect to said container and the said trough extension thereof so that its lower run extends along said sloping bottom and is effective to propel material upwardly therealong, and so that its upper run is positioned above and outwardly of said container; means associated with said upper run of the conveyor, for the supply thereto of discrete solids containing the constituent to be dissolved; a material-feed chute leading from said upper run of the conveyor into said container; a second scraper conveyor flanking the said lower run of the first, within and along said extension of said trough formation, the scraper elements of the respective scraper conveyors being staggered relative to one another in an arrangement such that a sinuous dispersing action of said discrete solids is obtained along the bottom of said extension above said container; drive means for operating said conveyors at the same speed; means for flushing the dispersed discrete solids with fresh solvent; and means for drawing off solution from said container.

2. The combination recited in claim 1, wherein a pair of scraper conveyors flank respective sides of the lower run of the first conveyor within and along the said extension of the trough formation.

3. The combination recited in claim 1, wherein a solids-settling column is defined within the container below the material-feed chute by spaced series of baffles, the bottom of said column opening into the lower run of the first conveyor.

4. The combination recited in claim 3, wherein substantially vertically disposed baffles are provided within the container adjacent the solution drawing-off means, to define solution-clarifying compartments.

5. Apparatus for extracting soluble constituents from solid materials, comprising a container for a liquid which is a solvent for the soluble constituent to be extracted from a solid material, said container being of narrow trough formation having an upwardly sloping bottom which continues uninterruptedly through an upwardly sloping extension of said trough formation beyond said container, said extension of the trough formation being significantly wider than said container; a scraper conveyor operatively disposed with respect to said container and the said trough extension thereof so that its lower run extends along said sloping bottom and is effective to propel material upwardly therealong; means for feeding into said container discrete solids containing the constituent to be dissolved; a second scraper conveyor flanking the said lower run of the first, within and along said extension of said trough formation, the scraper elements of the respective scraper conveyors being staggered relative to one another in an arrangement such that a sinuous dispersing action of said discrete solids is obtained along the bottom of said trough extension above the normal liquid level of the container; drive means for operating said conveyors at the same speed; means for flushing the dispersed discrete solids with fresh solvent; and means for drawing off solution from said container.

6. Apparatus as recited in claim 5, wherein walls are provided covering the container and the upward extension of the trough formation, enclosing the interiors thereof against escape of solvent vapors.

7. Apparatus for extracting soluble constituents from discrete solids, comprising a container having an upwardly sloping bottom which continues upwardly beyond said container to provide an elevated discharge for spent solids; conveyor means extending from a low point within said container upwardly along the sloping bottom thereof and along said extension of the sloping bottom to a discharge at the upper termination of the extension, said conveyor means comprising in its portion extending along said extension of the sloping bottom, a plurality of side-by-side positioned groups of longitudinally spaced transverse fingers which are staggered relative to one another, said fingers being operative to impart back and forth transverse motion to discrete solid particles during advance thereof along said extension so that they travel in sinuous paths as they are advanced toward said elevated discharge; spray nozzles disposed intermediate the length of said extension for spraying solvent onto the discrete solids being advanced toward discharge; wall means covering said container and said upward extension of the sloping bottom, whereby the interior of the apparatus is substantially sealed against the atmosphere; an inlet leading into said container for introducing discrete solids to be processed; valved outlet means leading from said container for discharging solute charged solvent therefrom; and an outlet for the depleted discrete solids discharged from the elevated end of said conveyor means.

HENRY E. LEWIS.

REFERENCES CITED

The following references are of record in the file of this patent:

UNITED STATES PATENTS

| Number | Name | Date |
| --- | --- | --- |
| 550,035 | Wheeler | Nov. 19, 1895 |
| 1,883,800 | Krider | Oct. 18, 1932 |
| 2,078,752 | Christensen | Apr. 27, 1937 |
| 2,263,458 | Gellatly | Nov. 18, 1941 |
| 2,405,105 | Kennedy | July 30, 1946 |
| 2,451,081 | Ford | Oct. 12, 1948 |

FOREIGN PATENTS

| Number | Country | Date |
| --- | --- | --- |
| 555,627 | France | Oct. 17, 1922 |